J. Brokenshire,

Ship Pump.

No. 4,111. Reissued Aug. 30. 1870.

Witnesses:
J. W. Masten
J. W. Poler

Inventor:
J. Brokenshire,
by Geo. W. Rothwell
Atty

N. PETERS, PHOTO-LITHOGRAPHER, WASHINGTON, D. C.

United States Patent Office.

JOHN BROKENSHIRE, FOR HIMSELF, OF KINGSTON, CANADA, AND GEORGE GOBLE AND J. D. MACFARLANE, ASSIGNEES OF JOHN BROKENSHIRE, OF OSWEGO, NEW YORK.

*Letters Patent No.* 80,905, *dated August* 11, 1868; *reissue No.* 3,280, *dated February* 2, 1869; *reissue No.* 4,111, *dated August* 30, 1870.

DIVISION B.

IMPROVEMENT IN PUMPS.

The Schedule referred to in these Letters Patent and making part of the same

*To all whom it may concern:*

Be it known that I, JOHN BROKENSHIRE, of Kingston, in the county of Frontenac, Province of Ontario, and Dominion of Canada, have invented a new and useful Improvement in Ship-Pumps; and I do hereby declare the following to be a full, clear, and exact description thereof, sufficient to enable those skilled in the art to which my invention relates to fully understand and to make and use the same, reference being had to the accompanying drawing forming part of this specification, and in which—

Figure 1:
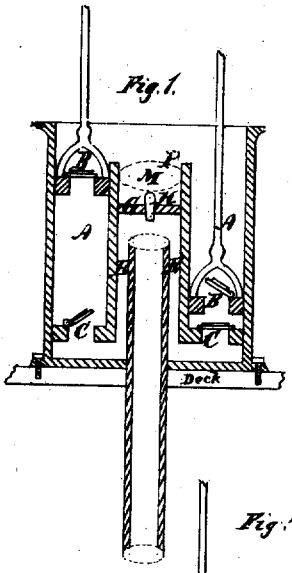
Figure 2:
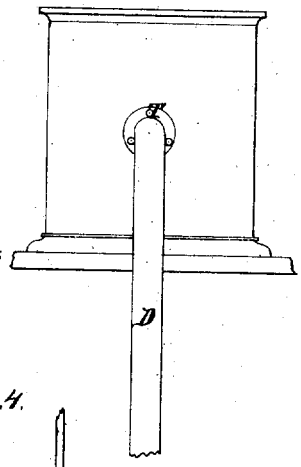
Figure 3:
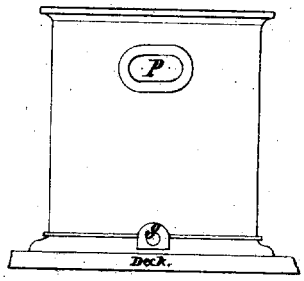
Figure 4:
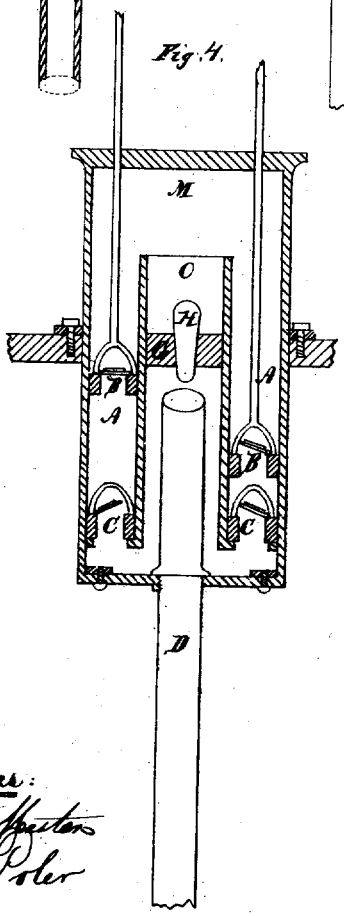

Figure 1 is a central vertical section;

Figures 2 and 3, side elevations;

Figure 4, a central vertical section, showing a modification of my pump; and

Figure 5:
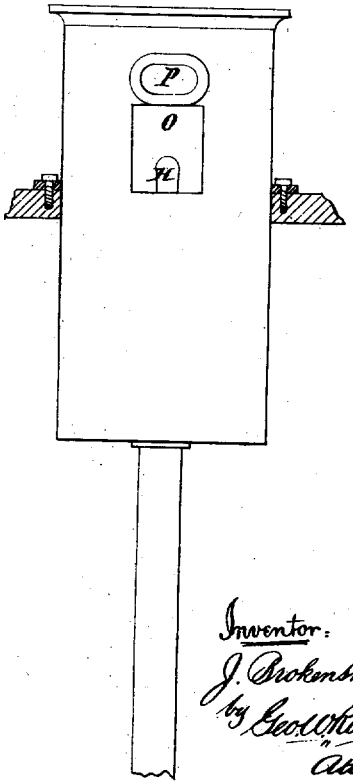

Figure 5, a side view of the same.

Similar letters of reference indicate like parts in the several figures.

This invention relates to double-acting ships' lift-pumps, having a chamber between and in direct communication with the barrels; and It consists in the attachment of the induction-pipe or hose at an orifice made in the side of the pump above deck, and communicating with the central chamber, whereby the point of attachment is rendered always accessible from above deck, for attaching and detaching the pipe or hose, and controlling the suction, as will be hereinafter more fully explained.

In the drawing—

A A represent the barrels;

B B, the plungers;

C C, the stationary valves; and

E, a chamber occupying a central position between the barrels.

G is a partition, in which is an opening fitted with a plug or valve, H.

M is the chamber in the upper part of the pump, through which the water passes on its way to the discharge-nozzle P.

O, figs. 4 and 5, represents an opening formed above deck, between the barrels A A, and beneath the upper chamber or outlet, so that the plug H, which is near the deck, may be readily removed and replaced.

These parts, together with the whole construction shown in figs. 1, 3, 4, and 5, being all fully described in another division of this reissue, it is deemed unnecessary to specify them more particularly in this instance.

In the side of the pump is made an orifice, communicating with the central chamber, and provided with a screw-thimble, or other suitable device, T, for the attachment of hose or pipe running either to the bilge or amidships, so as to pump water from different parts of the vessel.

The point of communication of the suction-hose or pipe with the pump being thus brought above deck, it is always accessible for attaching and detaching the hose, and controlling the suction.

This invention is especially useful when several pipes leading from different parts of the vessel unite at the orifice in the side of the pump; for, in such cases, a turn-cock or equivalent device must be employed at the junction of the pipes, which requires frequent adjustment in changing the suction from one part of the vessel to another.

Having thus described my invention,

What I claim as new, and desire to secure by Letters Patent, is—

In a double-acting ship's lift-pump, having a chamber between and in direct communication with the barrels, the attachment of the induction-hose or pipe at an orifice made in the side of the pump, above deck, and communicating with the central chamber, whereby the point of attachment is rendered always accessible from the deck, for attaching and detaching the pipe or hose, and controlling the suction, for the purpose stated.

JOHN BROKENSHIRE.

Witnesses:

S. B. HANCE,

J. R. SMEATON.